United States Patent
Melville (12) 
(10) Patent No.: US 6,205,275 B1
(45) Date of Patent: Mar. 20, 2001

(54) FIBER OPTIC IMAGE TRANSFER ASSEMBLY AND METHOD OF USING

(76) Inventor: Brian E. Melville, 5500 E. Briarwood, Cir., Littleton, CO (US) 80122

( * ) Notice: Subject to any disclaimer, the term of this patent is extended or adjusted under 35 U.S.C. 154(b) by 0 days.

(21) Appl. No.: 09/102,162

(22) Filed: Jun. 22, 1998

(51) Int. Cl.[7] .................................................... G02B 6/26

(52) U.S. Cl. ............................................. 385/43; 362/554

(58) Field of Search .................................. 385/115, 121, 385/116, 133, 147; 362/554; 250/361 C, 458.1; 422/52; 355/27, 222, DIG. 1, 50

(56) References Cited

U.S. PATENT DOCUMENTS

| | | | |
|---|---|---|---|
| 4,076,377 | * 2/1978 | Moraschetti | 385/115 |
| 4,299,447 | 11/1981 | Soltan et al. | 350/334 |
| 4,743,200 | 5/1988 | Welch et al. | 434/43 |
| 4,948,975 | * 8/1990 | Erwin et al. | 250/361 |
| 5,009,475 | * 4/1991 | Knudson | 385/115 |
| 5,293,437 | * 3/1994 | Nixon | 385/115 |
| 5,348,477 | 9/1994 | Welch et al. | 434/43 |
| 5,502,457 | 3/1996 | Sakai et al. | 345/87 |
| 5,532,711 | 7/1996 | Harris | 345/55 |

OTHER PUBLICATIONS

"Fiber-optic tapers offer high-quality image transmission", Weiss, Richard J, SPIE Web, OE Reports, www.spie.org/web/oer/february/feb97/research.html (printed May 15, 1998).

"Coherent Flexible Fiber Optic Image Guides", Schott Fiber Optics, Inc. IGSS SD/HA 100 Apr. 1994.

"Fiber Optic Wound Image Bundles", Schott Fiber Optics, Inc., www.schottfiberoptics.com/flexible.htm (printed May 15, 1998).

"Fused Fiber Optic Tapers", Schott Fiber Optics, Inc., www.schottfiberoptics.com/fused.htm (printed May 15, 1998).

"Fused Fiber Optic Tapers", Schott Fiber Optics, Inc., T SD/HA 100 Apr. 1994.

* cited by examiner

*Primary Examiner*—Akm E. Ullah
(74) *Attorney, Agent, or Firm*—Thomas W. Hanson (57) ABSTRACT

An image transfer assembly comprising a preferably flexible fiber optic guide and a pair of fiber optic tapers connected to the ends of the guide. The assembly can compress an image, transmit it via the guide and magnify it for viewing. The tapers may have either the same or different magnification/compression ratios. Alternatively, only single taper may be used. The image transfer assembly can be combined with an image source, such as a computer display to provide remote viewing of the image. When used for prototyping or simulation of control systems, the assembly provides significant flexibility in placement of simulated instruments and gauges, increasing the fidelity of the model.

9 Claims, 13 Drawing Sheets

FIBER OPTIC IMAGE TRANSFER ASSEMBLY AND METHOD OF USING

FIELD OF THE INVENTION

This invention relates to the use of fiber optics to transfer an image from one location to another a short distance away. More specifically it relates to the use of one or more fiber optic tapers coupled to a fiber optic guide to compress an image, transmit via a flexible medium and enlarge it for display. It also relates the to use of this mechanism to implement prototype or functional instrument or control panels.

BACKGROUND OF THE INVENTION

In many areas of society, complex systems are controlled by human operators relying on information provided by instruments and gauges which monitor the system. These systems include power generation plants, nuclear reactors, commercial aircraft, heavy equipment and trucks, the space shuttle, and will expand to include such systems as the International Space Station. Mistakes in the operation or design of these systems can compromise the safety of the operator, crew, passengers, or the public at large. Representative design errors include gauges which can not be read from the operator's normal position, controls which can not be reached from the operator's normal position, and controls which can not be reached while simultaneously viewing the necessary gauges which are providing feedback. Because of the consequences of such errors, the design and layout of control panels is critical.

Instrument and control panel design is a complex and often lengthy process which must consider many factors including readability of gauges, viewing angles to gauges, access to controls, feel and range of movement of the controls, ergonomics, and resistance to environmental factors such as vibration, dust, water, etc. Typically, several iterations of a design will be tried before the final design is approved. Each iteration may be very expensive. This expense may limit the number of iterations allowed for during the design to less than that needed from a technical standpoint. However, re-design of a faulty control system which has already been fielded is far more expensive. For example, wiring looms, air ducts, and mechanical controls may have been custom designed for a specific layout and would have to be redesigned if an instrument needs to be relocated.

Design iterations are most expensive where the real instruments and gauges from the final system are used. This equipment is expensive and not adapted to ease of reconfiguration. Prototyping is often used to reduce the cost of design iterations. Prototypes can range from scale or full size drawings of the control panel to mock-ups with dynamic displays to fully interactive simulations of the complete system. Each of these approaches trades cost against the fidelity of the representation. The better the fidelity, the more accurate the information gathered from the use of the prototype. Static drawings are valuable for initial decisions but are inadequate for evaluating operational scenarios. Interactive simulations are capable of providing very accurate data on operator response times, decision making, and the ability to accurately control the system. Alternate panel layouts can then be compared to optimize the design. The greater the cost savings for each iteration the larger the number of alternatives that can be explored, and the greater the likelihood that a safe system will be developed. The need, therefor, is for inexpensive, easily reconfigured, yet high resolution prototyping capabilities.

High resolution simulations are also valuable for training purposes. The human operator(s) can be presented with a variety of both normal and emergency situations to which they must respond as they would with the real system. Sufficient training time can develop automatic, calm responses to "once in a lifetime" situations of a critical nature, resulting in significant savings of life and damage when the situation does arrive. For this type of training, the fidelity of the simulation is critical. Gauges and controls must be located where the operator expects them to be and controls must respond exactly as the real controls so that the operator does not have to look away from the instruments to locate a control. This is true both while training and so that the experience gained will directly transfer to the operational system when the trainee is on the job. While these concerns can be addressed for some non-emergency training by performing it on the operational systems, this is usually not cost effective.

Figure 1:
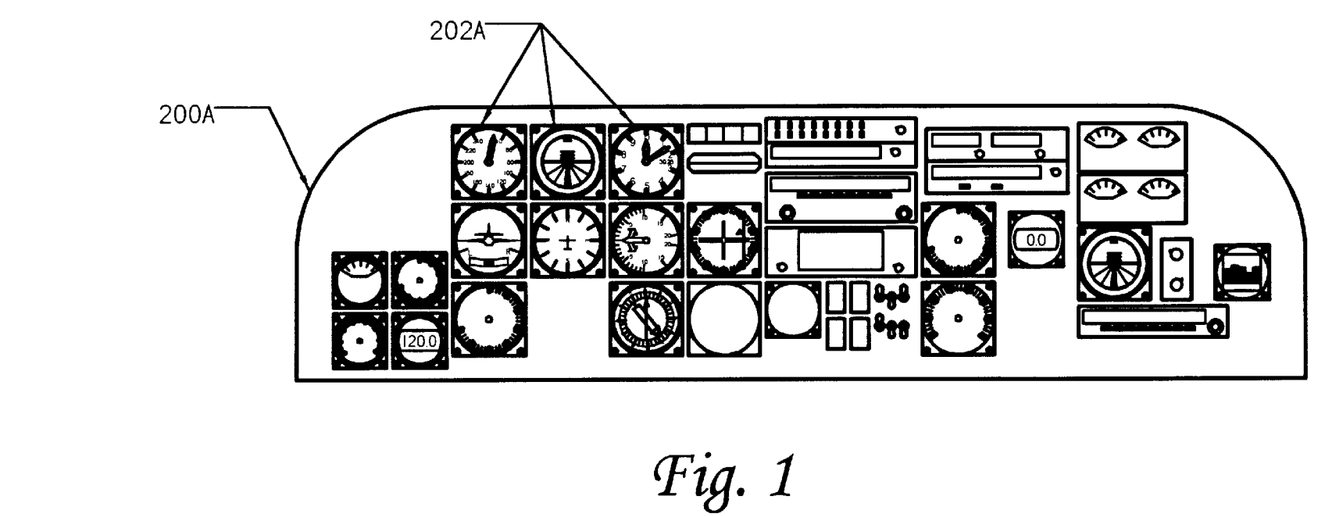
FIG. 1 illustrates a typical aircraft instrument panel as seen from the front.
Figure 2:
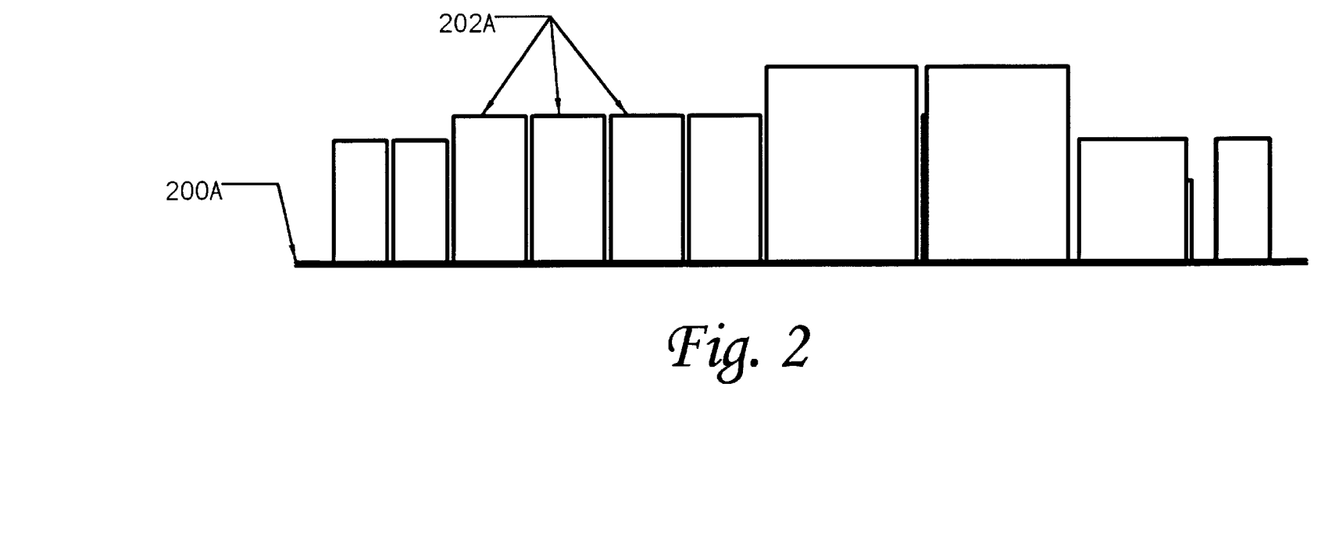
FIG. 2 illustrates the instrument panel of FIG. 1 as seen from the top showing the gauges as they extend behind the instrument panel.

A variety of approaches to prototypes and simulations have been used. The highest fidelity, and most expensive is to use the real instruments in a design mock-up. FIG. 1 shows a representative aircraft instrument panel prototype as might be applicable to a regional airline. Gauges, 202A, are mounted to an instrument panel, 200A, in the same layout as in the actual aircraft. FIG. 2 shows a top view of the panel illustrating the corresponding spacing of the instruments behind the panel. The instruments are often very expensive, having been designed and built for the final environment, such as an airline cockpit. The cost is further increased by the necessity to keep spares on hand. Implementation of the mock-up can also be expensive as the environmental needs of the instruments must be met. This approach may require high voltage power supplies, high capacity cooling, and complex data inputs and outputs which emulate the real-world systems. In some situations, simulated electromechanical instruments may be available, which reduce the cost. However, they may not be readily available and do not alleviate the other concerns. This approach is not feasible where a system is being designed that will be using new instruments or new instrument designs. In these situations the real instruments are not yet available.

Figure 3:
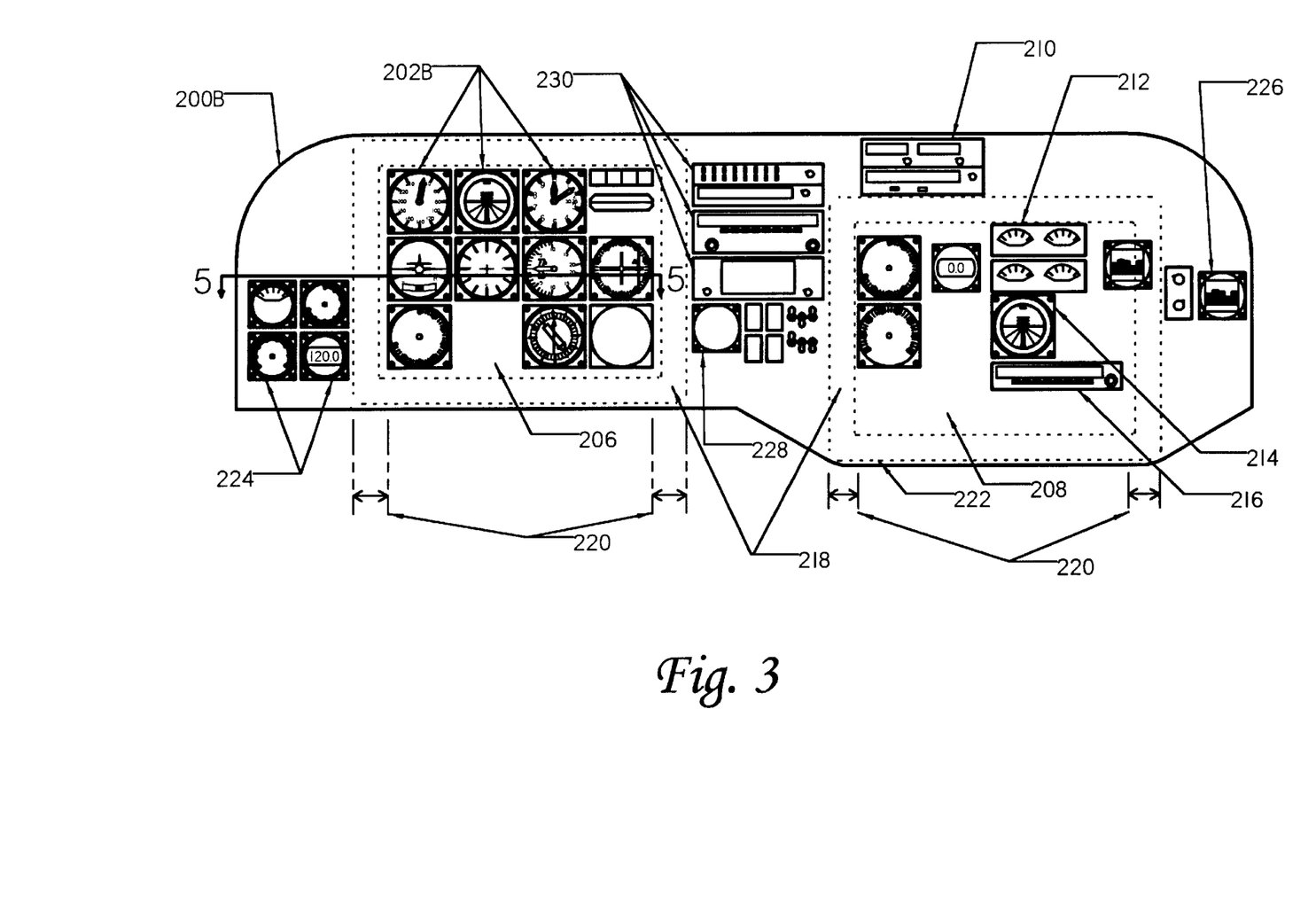
FIG. 3 illustrates a simulated instrument panel using conventional computer display gauge simulation techniques.
Figure 4:
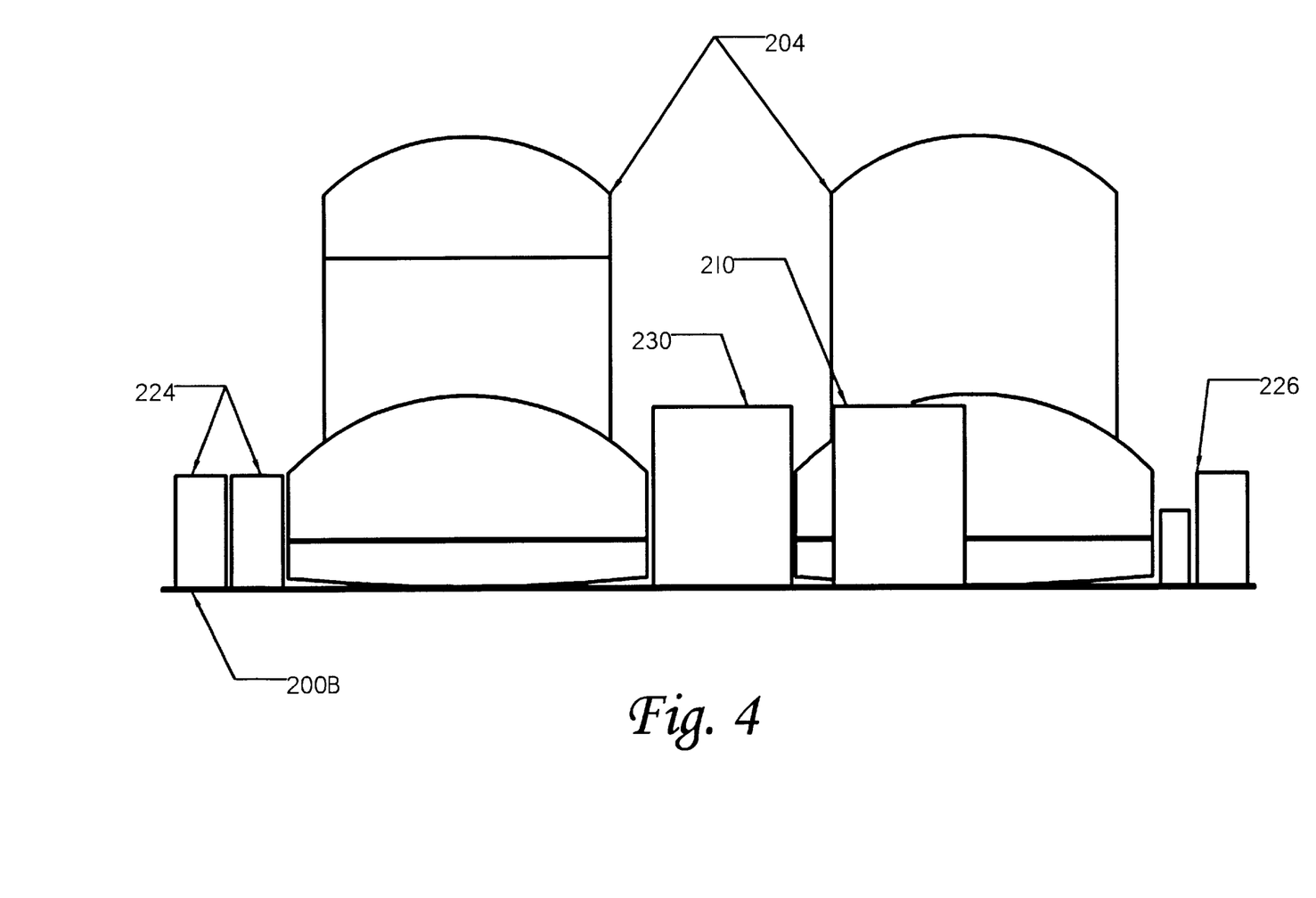
FIG. 4 provides a top view of the simulated panel of FIG. 3 showing the relative placement of the computer display units.
Figure 5:
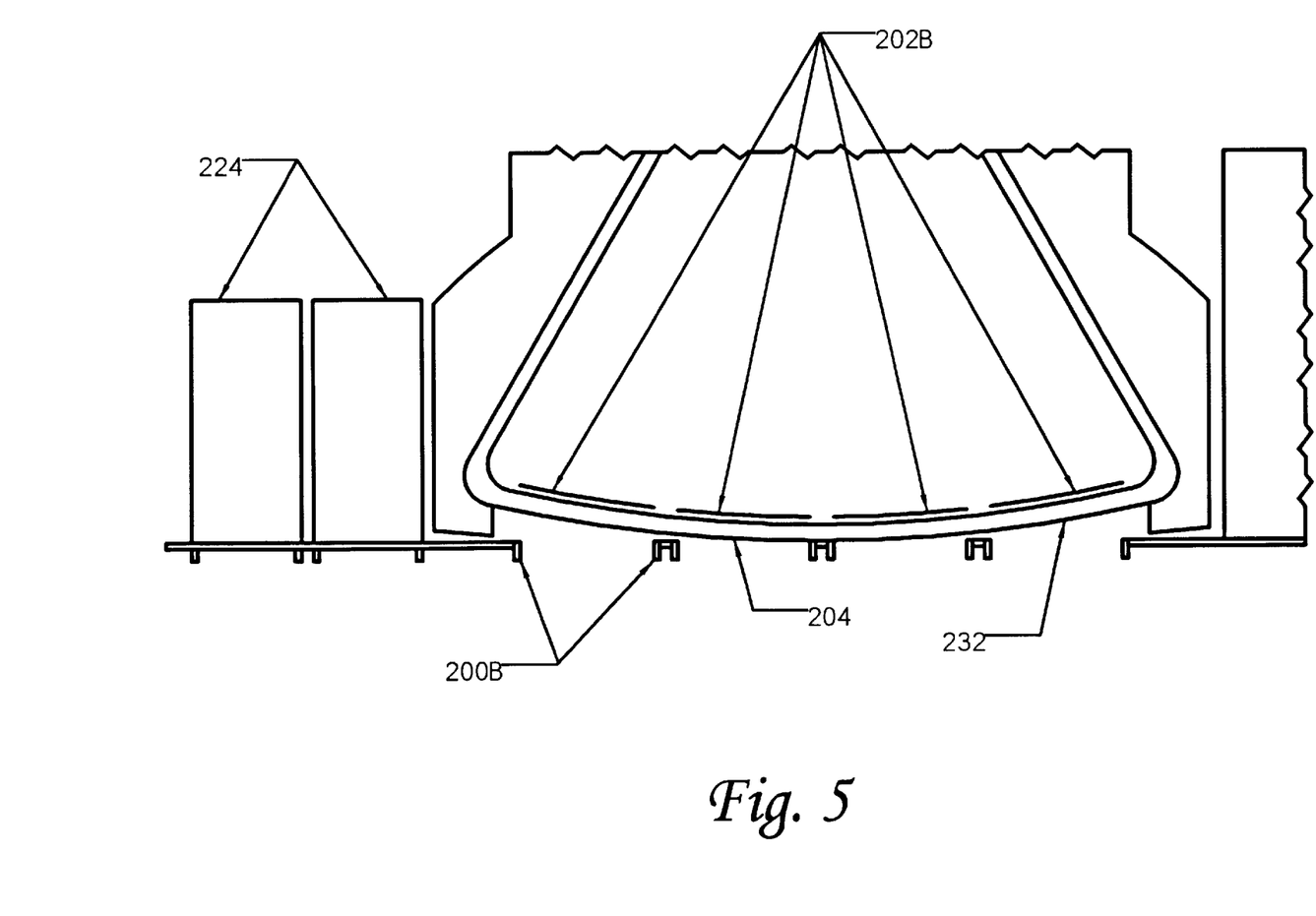
FIG. 5 provides a top view cross-section of one side of the simulated instrument panel.

One approach to avoid using real instruments is to use computer displays, such as CRT screens, to generate the instrument images. The images are then masked by a physical face plate to provide the appearance of an instrument panel. FIG. 3 shows a simulated instrument panel corresponding to the mock-up of FIG. 1. FIG. 4 illustrates the placement of the CRT screens behind the panel. FIG. 5 provides a cross-section through the CRT showing the detailed positioning as it would appear from a top view. The faces of the gauges, 202B, are displayed on the CRT screens, 204, positioned immediately behind the panel, 200B.

Several problems exist with this approach which directly impact the fidelity of the simulation. Primary of these is the constraints imposed by the size and shape of the display screen, 206 and 208. Gauges must be arranged so that they appear entirely within the bounds of the screen. In the example panel, it was possible to maintain the real layout of the gauges on the left-hand screen, 206. However, screen 208, required altering the position of certain gauges. Unit, 210, is a radio device which must be represented by a real unit in order to provide the communications functionality of the unit. As such, it could not be modeled on the CRT and was placed outside the boundaries of the display. However, gauges, 212, were to be modeled on the CRT screen and had to be placed within the screen boundaries. This combination resulted in the positions of instruments 210 and 212 being shifted relative to each other to allow their simulation. This layout no longer matches the real layout, reducing the fidelity. It was also necessary to reduce the size of gauges, 212, to fit them onto the screen without also moving gauge, 214. In some situations, this will have far reaching effects as other gauges are then reduced in size to maintain proper relative sizes between the gauges. Alternatively, the decision could be made to make a device non-functional to enable the simulation as a whole. Here, device, 216, is represented on the screen, but is non-functional. This also impacts the fidelity of the simulation as this functionality is not available to the operator (pilot).

A second significant problem is the space at the edge of the CRT screen, 218, which is unusable for display purposes. This consists of an unusable portion of the screen itself, plus the space occupied by the support structure (housing or shell) enclosing the screen. While this space can not be used to display gauges, it does occupy physical space behind the instrument panel. This results in artificial gaps, 220, in the instrument panel in which no instrument can be located. A similar problem exists where the dimensions of the display must be accommodated. An example occurs on the right side where the lower edge of the CRT, 222, extends below the normal lower edge of the instrument panel. This was necessitated by the placement of the radio units, 210, at the top of the panel, above the CRT screen.

Another limitation of this approach is that it is impractical for use with isolated instruments, 224 and 226, and impossible to use with isolated gauges, 228, which are surrounded by functioning instruments, 230, which take up space behind the panel.

Figure 6:
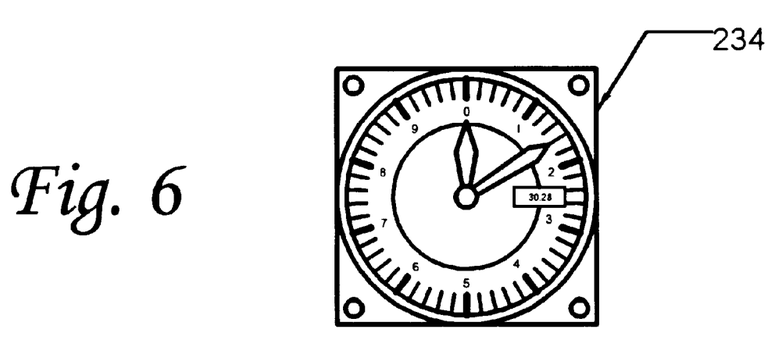
FIG. 6 illustrates a straight-on view of a single gauge.
Figure 7:
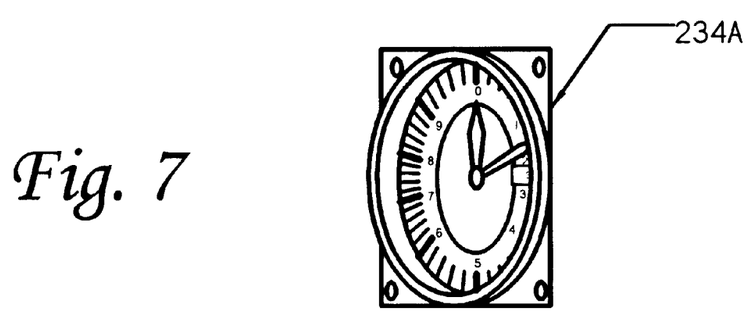
FIG. 7 illustrates how a real gauge might appear as viewed from an angle.
Figure 8:
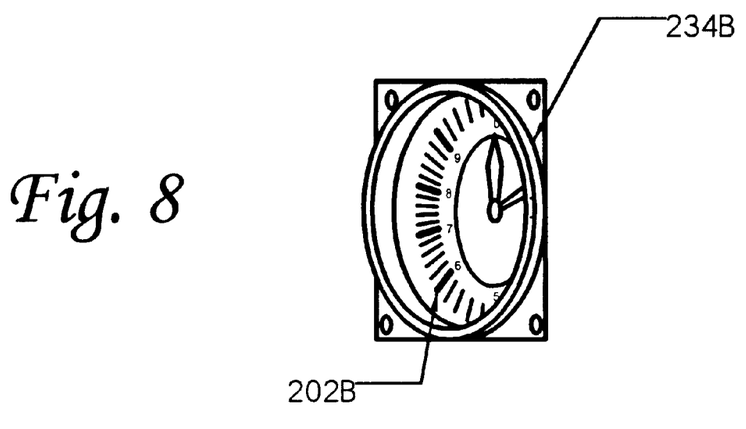
FIG. 8 illustrates how a computer display simulated gauge might appear when viewed from the same angle as FIG. 7.

A further problem with this approach involves the off-angle viewing of the gauges as illustrated by FIGS. 6–8. FIG. 6 shows a representative gauge, 234, as it would appear face-on. From this angle, the CRT simulation can appear identical to the real gauge. FIG. 7 illustrates a real gauge, 234A, as it would appear from an angle. This is how a copilot might see a gauge positioned in front of the pilot or how a power plant operator might view a gauge positioned on an adjacent sub-panel. Because the face of this real gauge is aligned essentially with the surface of the instrument panel, it is only slightly obscured by the rim of the gauge. FIG. 8 illustrates how the simulated gauge, 234B, might appear when represented on a CRT screen. In the worst case scenario where the gauge is located in an edge position, 232 in FIG. 5, the image, 202B, is actually located well behind the plane of the instrument panel due to the thickness of the glass and the curvature of the screen. The obscuration becomes significant, blocking almost one half of the gauge.

Figure 9:
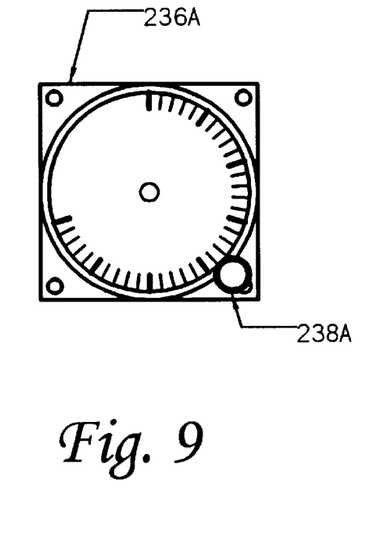
FIG. 9 provides a straight-on view of a gauge which includes an adjustment knob.
Figures 10, 12:
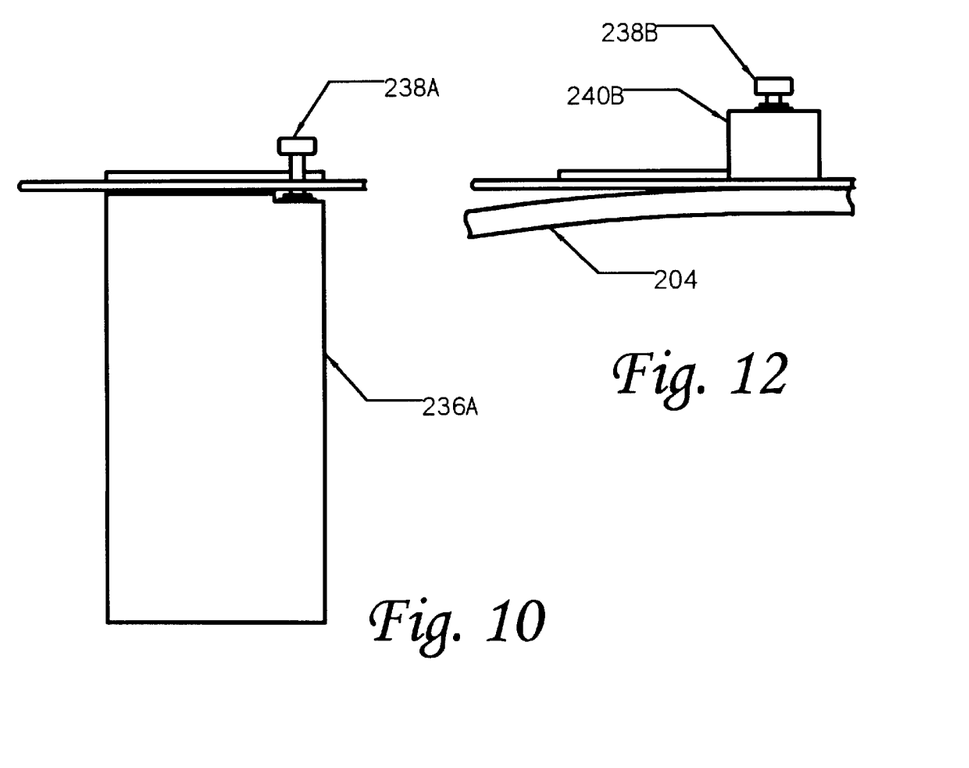
FIG. 10 illustrates how the knob is typically incorporated into the body of the gauge.
FIG. 12 illustrates the placement of the knob adjacent to the simulated gauge.
Figure 11:
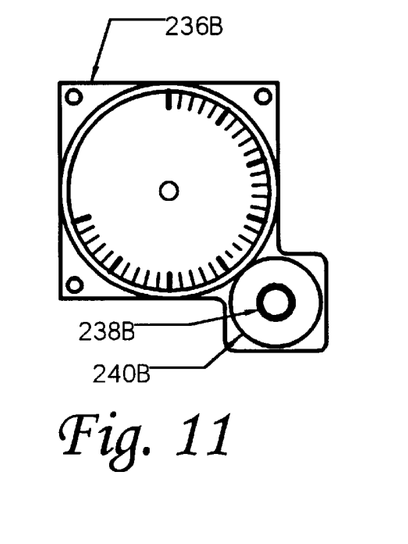
FIG. 11 provides a front face view of the simulated gauge with knob.

The use of CRT screens to generate the gauge images also causes a problem with the representation of related controls. FIG. 9 illustrates a generic gauge, 236A, with an integral adjustment knob, 238A. As shown in FIG. 10, the knob connects to an adjustment mechanism which is within the housing of the gauge. Where the gauge is simulated by a CRT screen, FIGS. 11 and 12, the control knob, 238B, must be implemented with a separate mechanism. Because the CRT screen is located close to the instrument panel to provide the best image presentation, there is no space behind the panel for the control mechanism. This requires that the control be housed in front of the instrument panel, 240B. In order to accommodate the control circuitry and requisite wiring connections, this housing may be quite large. In existing aircraft flight simulators, the diameter of the housing may be as large as one-half the diameter of the gauge. This impacts the fidelity of the representation by altering the location of the control in two ways. First, the control protrudes significantly from the front of the panel. Secondly, the control has to be moved away from the center of the gauge so that the housing does not intrude on the face of the gauge. Both of these changes result in a control which is positioned differently than in the real system. Where the control would be operated by touch this can be an important difference. In addition, moving the control laterally effectively increases the size of the gauge, requiring increased spacing from adjacent gauges. The use of low profile or smaller controls can help alleviate the above problem but usually increases the cost and introduces further fidelity problems as the feel of the control, and possibly the range of movement, is different than that of the real control.

Several techniques have been used to reduce the problems posed by computer display simulations. The use of flat screen displays eliminates the curvature of a conventional CRT screen and helps reduce the amount of obscuration present, but does not alleviate any of the other problems. In addition, large flat screen displays are significantly more expensive that conventional CRT displays.

Plexiglas inserts have been used to provide the illusion that the instrument face is at the correct location relative to the instrument panel. However, since it does not actually alter the location at which the image is displayed, it does not solve the obscuration problem. It has no effect on any of the problems.

Figure 13:
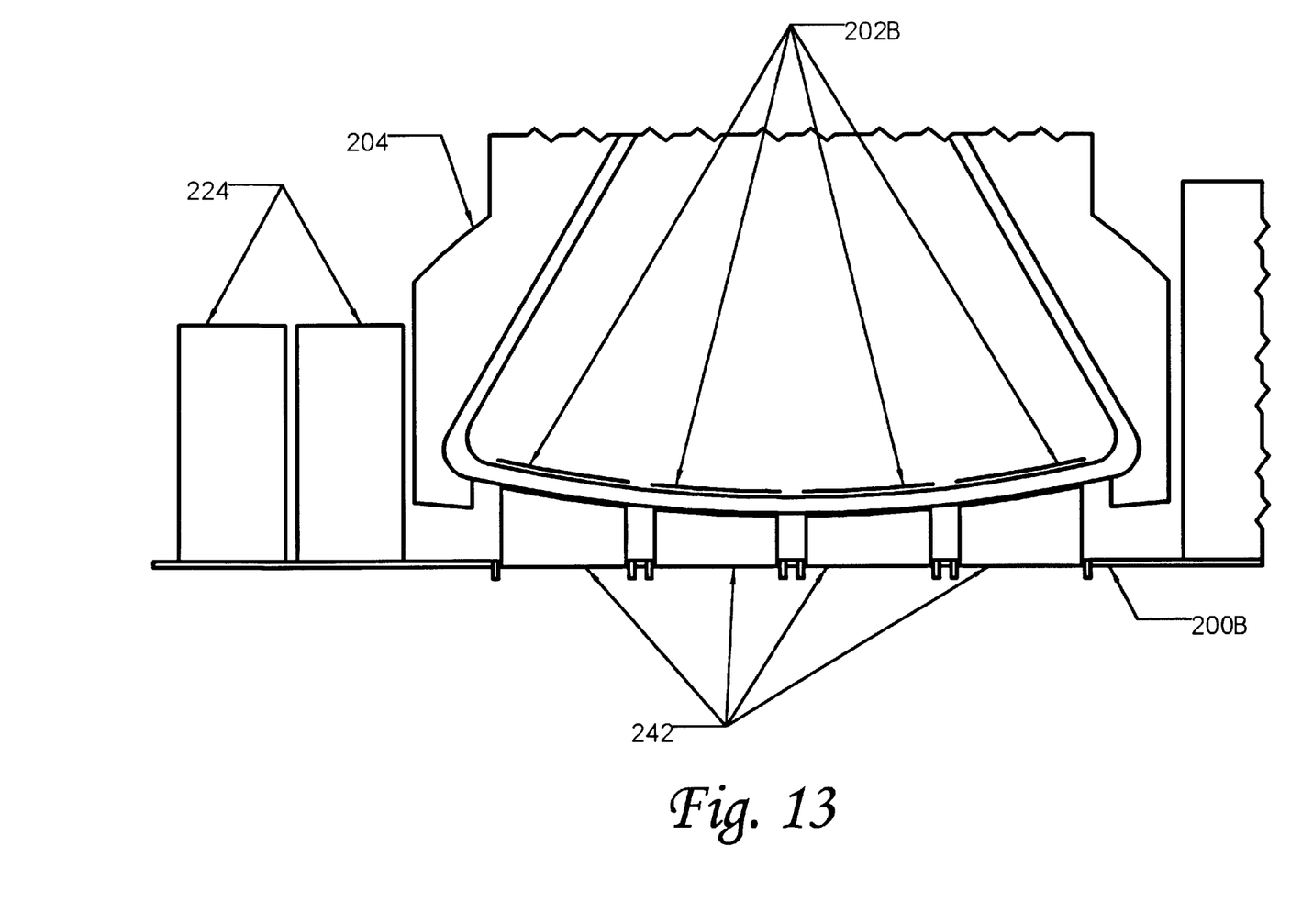
FIG. 13 illustrates the use of full diameter fiber optic guides.

The use of full diameter fiber optic guides (or conduits), FIG. 13, has been suggested although no actual implementations of the technique are known. The guides, 242, would transmit the image, 202B, from the face of the CRT screen, 204, to a position corresponding to the face of the real gauge. This would solve the off-angle viewing problem since the image of the gauge would be in the correct plane. However, these full size guides are very expensive to manufacture at the requisite quality and the diameters required (3 inches or more) may be beyond current production capability. Additionally, the full diameter guides are quite heavy, requiring substantial support structure. This technique does not solve any of the problems discussed above other than off angle viewing. There is still a direct one-to-one correspondence between the location of the gauge images on the screen and the panel location of the gauges. Space is still lost at the edges of the screens and gauge positions must be adapted to the screen shape. The problem with protruding controls is not solved because the full diameter guides do not allow sufficient room between them to position a control behind the panel.

Fiber optic techniques have also been used in other fields to solve viewing problems. Fiber optic guides are used in the medical and photographic fields to transmit an image from where it can be perceived to where it can be viewed or recorded. Most often this involves coupling a lens to one end of the guide and a camera to the other end. The lens, which is significantly smaller than the camera, can then be inserted into a small opening allowing the image to be remotely recorded or viewed. This technique is perhaps most widely known for its use in arthroscopic surgery and is also used for machine inspection via small access ports.

Fiber optic tapers are used to magnify or minify (reduce) images for viewing. One common application is to compress a received image and transfer it to a CCD imaging device. Arrays of tapers are used to provide line scans and 2-D tiled arrays can be used to capture larger images. Tapers are also used to enlarge images in the VVS-2 night drivers' viewer used in Army tanks.

There is a need for a method of prototyping or simulating instrument display panels which provides increased flexibility in the positioning of instruments and gauges. Preferably this method would allow for computer generation of the instrument face, allowing rapid alterations to their appearance. It should be possible to relocate the simulated instrument within the control panel with minimal time and cost. Preferably the method should impose no artificial constraints on the location of the instruments. There should be no lost space due to computer display housings. It should be possible to position a simulated gauge adjacent to, or, ideally, surrounded by other devices which extend a significant distance to the rear of the control panel. There should be no off-angle obscuration which exceeds that of the real gauges. It is also preferable that a control can be inset behind the instrument panel immediately adjacent to a simulated gauge in the same relative position as the real control on the real gauge. The cost of this prototyping technique should be sufficiently less than the use of real instruments to enable multiple iteration prototyping and design refinement.

SUMMARY OF THE INVENTION

The present invention is directed to an apparatus for fiber optically transmitting an image for display remote from the image source. According to the invention there is provided a fiber optic guide and one or more fiber optic tapers optically coupled to the guide. In the preferred embodiment, two tapers are used, one at each end. This provides means to optically compress the image to the size of the guide, transmit it to the second taper and enlarge it for viewing. Preferably, the guide is flexible.

According to an aspect of the invention the two tapers can be of the same size, providing full size viewing of the transmitted image.

According to another aspect of the invention the tapers may be of different sizes, and magnification ratios, providing either compression or magnification of the transmitted image.

According to yet another aspect of the invention, the fiber optic guide and fiber optic tapers can be combined with a computer display to provide viewing of the computer generated images remote from the computer display.

According to still another aspect of the invention, a method of displaying images in a panel, such as a simulated control panel, is disclosed which uses a computer system with display, fiber optic tapers, a fiber optic guide, optical coupling means to connect one of the tapers to the display and mounting means to mount the second taper to the panel. In alternative methods, the tapers used for each of the assemblies may be of the same size, of different sizes, and may provide a mixture of full size, magnified, or compressed image transfer.

The advantages of such an apparatus are that prototype or simulated control panels can be designed using computer generated images for the face of the instruments without the constraints imposed by current techniques. Artificial arrangement of the instruments to accommodate lost space at the edge of the computer display or to fit the gauges within the screen boundaries are not required. The location of the simulated instruments can be changed by moving the output end of the fiber optic assembly. Since the output taper can be made to be no larger than the actual, or desired, instrument, it can be positioned immediately adjacent to other devices which protrude behind the panel. Off-angle viewing results in the same obscuration characteristics as the real gauge because the generated image can be presented in the same plane as the face of the real gauge. Cost savings are realized to enable multiple design iterations.

The above and other features and advantages of the present invention will become more clear from the detailed description of a specific illustrative embodiment thereof, presented below in conjunction with the accompanying drawings.

DESCRIPTION OF THE PREFERRED EMBODIMENT

The following discussion focuses on the preferred embodiment of the invention, in which a combination of fiber optic guides and fiber optic tapers are used to implement a simulated aircraft instrument panel. However, as will be recognized by those skilled in the art, the disclosed method and apparatus are applicable to a wide variety of situations in which remote display of computer generated images is desired. The aircraft instrument panel is used for much of the discussion as it effectively demonstrates the applicability of the present invention. However, the invention is equally applicable to prototyping and simulation of other types of control panels and instrument panels, implementation of actual control or instrument panels, and prototyping and implementation of similar displays which do not involve gauges and instruments such as a video production console which incorporates multiple video monitors.

The following is a brief glossary of terms used herein. The supplied definitions are applicable throughout this specification and the claims unless the term is clearly used in another manner.

Computer Display—any computer driven display capable of generating an image. Includes Cathode Ray Tube (CRT) and flat-screen (LCD, LED, Plasma, etc.) displays. Where the specific type of display is relevant, it will be specified.

Displayed Image—the image as it is presented to the user or operator. In the preferred embodiment it generally appears as the face of the instrument in the control panel but is intended to include any transmitted image.

Fiber Optic Guide—in the preferred embodiment, a coherent, flexible fiber optic bundle. Generally any equivalent mechanism which provides transmission of an image from one end of a guide to the other by means of a flexible medium.

Fiber Optic Taper—a coherent fiber optic plate that transmits either a magnified or minified image from its input surface to its output surface. The magnification (or minification) ratio is the ratio of the diameters of the large and small ends of the taper. Since light can pass through the taper in either direction, a taper serves equally well to magnify or minify (reduce) an image. Representative tapers, as well as fiber optic face plates and fiber optic image guides, are commercially available from Schott Fiber Optics, Inc., Southbridge Mass.

Generated Image—image of the instrument (or other display) as shown on the computer display.

Gauge—generally a specific type of instrument in which information is presented relative to a scale, such as by a moving needle or moving bar chart. For the present discussion, gauge is generally interchangeable with instrument.

Input, Output—with reference to a fiber optic component or combination, input specifies the end at which the image is generated or supplied and output specifies the end at which the image is presented for viewing or further transmission.

Instrument—a device which presents visual information to a user or operator. This can include analog gauges, digital read outs, bar charts, and video displays.

Image source—in the preferred embodiment, this is generally a computer display. It could also be a video monitor or any other device capable of generating a visual image. In certain applications the image source (and the transmitted image) could be outside of the visible spectrum, such as infrared or ultraviolet.

The disclosed invention is described below with reference to the accompanying figures in which like reference numbers designate like parts.

The present invention utilizes a combination of one or more fiber optic tapers and a fiber optic guide to transfer an image from a computer display to a viewing location, typically an instrument or control panel. The use of the individual components is known for a variety of applications. Fiber optic guides are now widely used in applications from automotive design to photography to medical imaging. Generally these are bundles of individual optical fibers, each of which conducts light independently of the others using total internal reflection. A bundle of small diameter fibers provides high resolution transfer of an image from one end to another.

Fiber optic tapers are much less well known. They are formed from a solid glass "boule" comprised of very large number of precisely aligned fibers which are stacked and fused together. The individual fibers may be as small as 4–6 micrometers in diameter. The boule is similar to the fiber optic guide in its ability to transfer an image from one end to the other, but is rigid. Tapers are formed by carefully heating the center portion of the boule and drawing the ends apart. The result is an hourglass shape with the center of the boule being stretched in length and reduced in diameter. This lengthening and reduction in diameter also occurs to each of the fibers making up the boule. The boule is then cut into two tapers with the ends and the very middle of the boule discarded. Each taper is a coherent fiber optic guide where each end of the guide, and each end of all of the constituent fibers is a different diameter.

Figure 14:
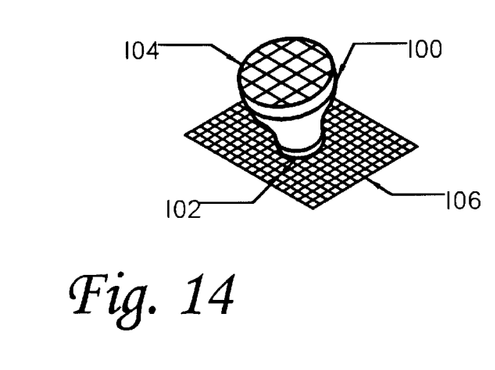
FIG. 14 illustrates an optical taper used to magnify.

FIG. 14 illustrates a single fiber optic taper, 100, placed on a grid, 106, which serves as a simple image. With the small end of the taper, 102, placed on or near the image, the taper serves to magnify the image. The large end of the taper, 104, presents an enlarged image of the area covered by the small end. The ratio of magnification is determined by the ratio of the diameters of the two ends and can be altered during manufacture by altering the respective diameters. Tapers are available in both round and rectangular cross sections and may have different shapes at each end.

Figure 15:
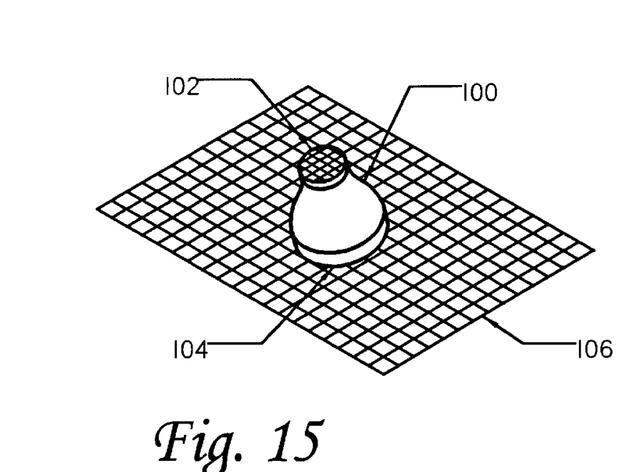
FIG. 15 illustrates an optical taper used to reduce.

The fiber optic taper can transmit light in both directions, and serves equally well to reduce (minify) an image. In FIG. 15, the taper, has been placed with the large end, 104, against the grid. The small end, 102, displays a reduced version of the image.

Figure 16:
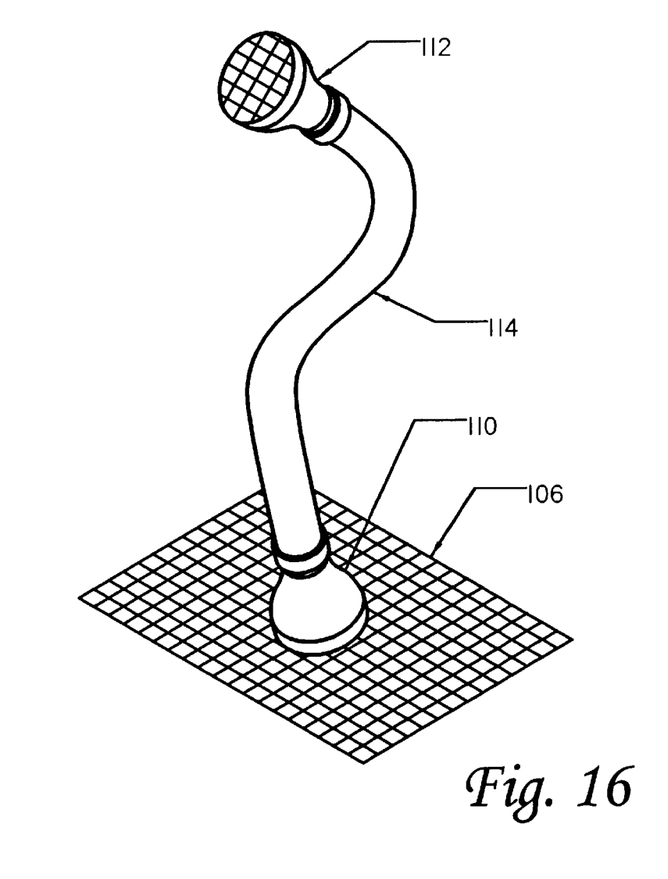
FIG. 16 illustrates the use of two optical tapers, coupled by a fiber optic guide, to transmit a full sized image.

FIG. 16 illustrates a combination of fiber optic tapers and a fiber optic guide which is a novel aspect of the present invention. The two tapers, 110 and 112, are optically coupled to the fiber optic guide, 114. Both tapers are coupled to the guide at their smaller ends. The effect, as shown, is to compress a received image at the input end, 110, to the diameter of the guide, transmit it to the output end, 112, and enlarge it for viewing. Reversing the tapers, so that their large end is coupled to the guide, is also possible for smaller tapers. The compression and re-enlargement allows a small diameter guide to transmit a much larger image. The small diameter of the guide provides flexibility, reduced cost, and reduced weight making the transfer of large diameter images feasible. The flexibility of the guide allows the output image to be presented in a different plane than the input image and, if desired, rotated from its original orientation. For simplicity, the remainder of the discussion will refer to this combination of fiber optic guide and tapers as an image transfer assembly.

In FIG. 16, tapers of equal diameter and magnification/minification ratios are used at each end of the guide. This provides full size viewing of the image at the output end. As will be discussed below, tapers of different diameters can be used to provide end-to-end magnification or reduction of the image size. Alternatively, a taper can be used at only one end of the guide.

Figure 17:
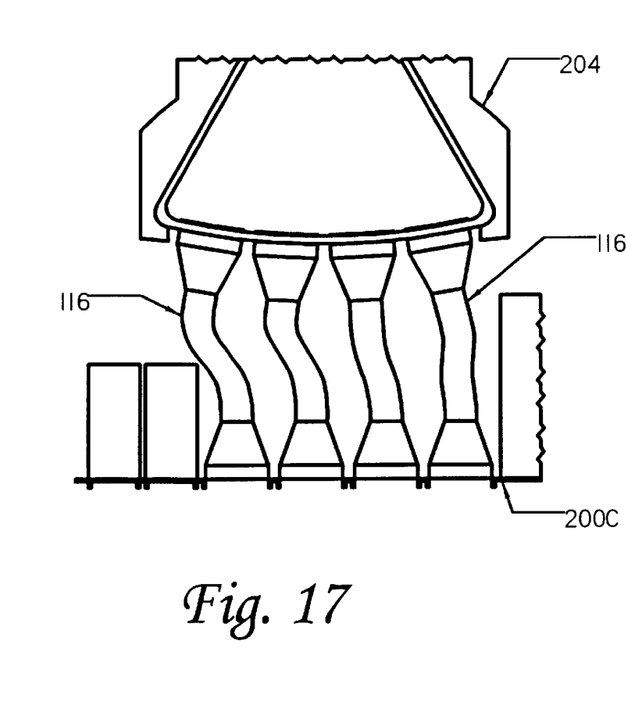
FIG. 17 illustrates the use of the present invention to offset the computer display from the panel.

FIG. 17 illustrates the use of an image transfer assembly to provide an alternative implementation of the representative aircraft instrument panel shown in FIG. 1. One or more image transfer assemblies, 116, are used to transfer images from the computer display, 204, to the face of the instrument panel, 200C. In the preferred embodiment, one image transfer assembly is used for each gauge to be displayed. Alternatively, a transfer assembly using a larger taper could be used to transfer the images for two or more collocated gauges. An immediate advantage of the use of the fiber optic image transfer assemblies is that the actual, or desired, spacing of the instruments can be maintained. The diameters of the fiber optic tapers can be matched to the diameters of the instrument faces. Therefor, they occupy no more space on the instrument panel than the actual or anticipated gauges. The computer display can be set back sufficiently from the instrument panel that it does not interfere with the location of the remaining devices allowing them to be fully functional. Referring to FIGS. 3 and 4, the gaps, 220, which were necessary to accommodate the computer display are eliminated when the image transfer assemblies are utilized.

If necessary to provide the desired image transmission characteristics, a fiber optic face plate may be used to couple the tapers to the computer display. The use of these face plates is well known in the art and is understood by those skilled in the art.

Figure 18:
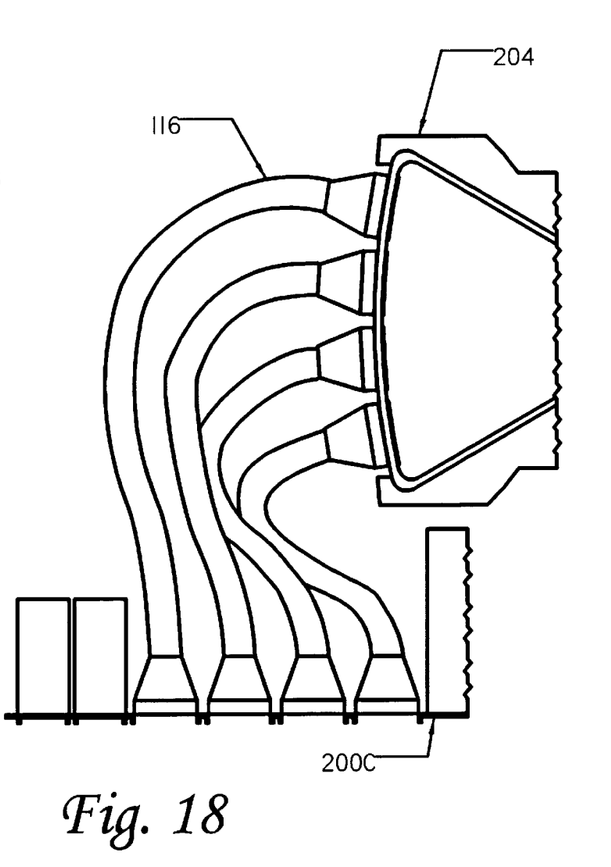
FIG. 18 illustrates an alternative arrangement of the present invention.

As FIG. 18 shows, the computer display, 204, need not be in the same plane as the instrument panel. This provides great flexibility in positioning the display for optimum design. It can face upward, downwards, or at any angle which best optimizes mounting, access, weight distribution or any other factor. If desired, the computer display can be mounted remotely from the instrument panel such as in an adjacent computer rack. This would be beneficial in a prototyping environment where it may be desirable to directly view the images on the computer display as they are being developed or to reposition the tapers relative to the display as alternative configurations are tried.

Figures 20, 21, 22:
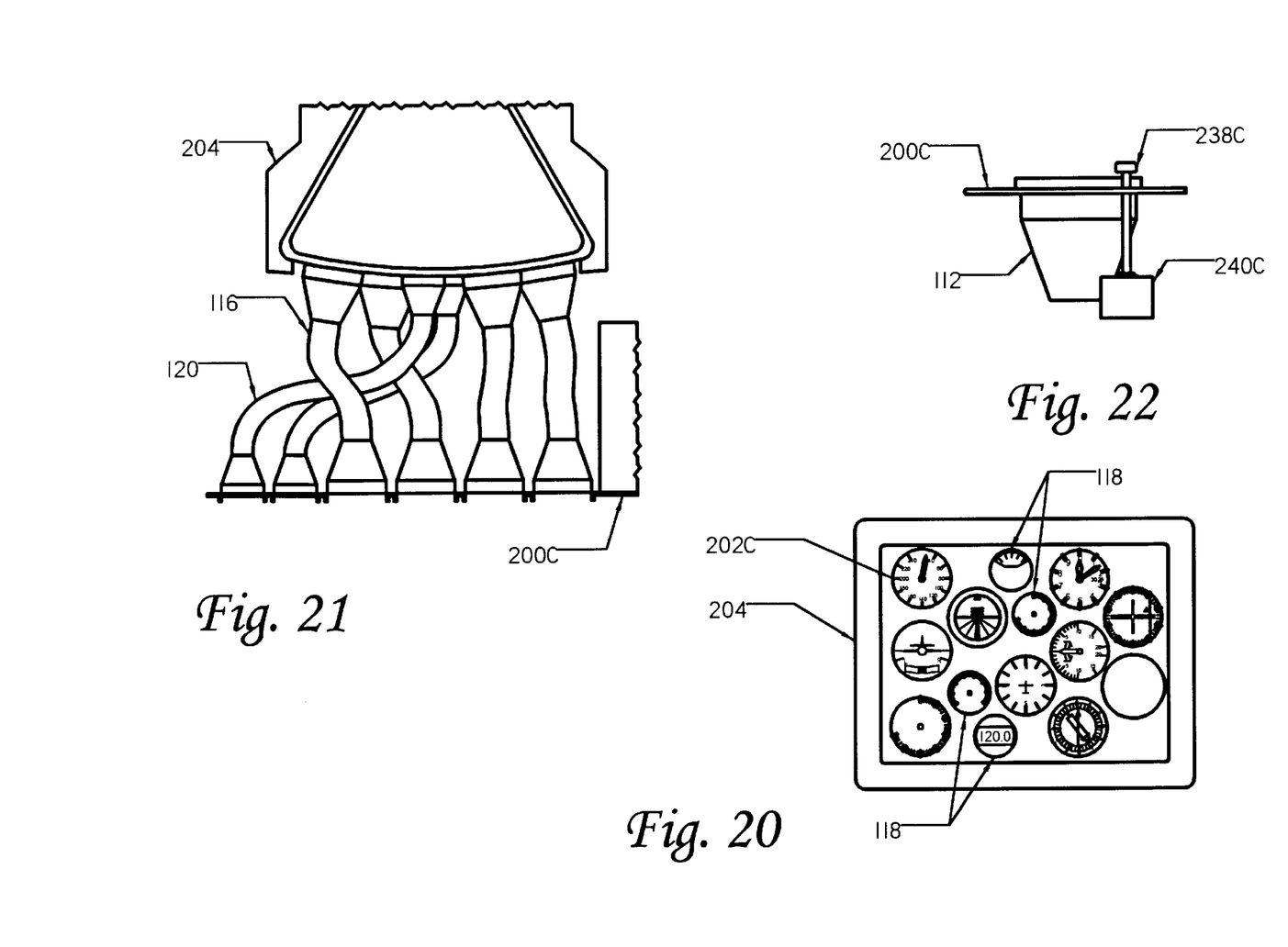
FIG. 20 illustrates a compressed arrangement of simulated gauges on the computer display.
FIG. 21 illustrates the use of the present invention to provide an increased number of simulated gauges using a compressed gauge layout.
FIG. 22 illustrates one arrangement of a simulated adjustment knob adjacent to the fiber optic taper of the present invention.

A second benefit of the use of the fiber optic image transfer assemblies is illustrated by FIGS. 20 and 21. The flexibility of the fiber optic guides implies that the position of the instrument images on the computer display, 202C, do not need to correspond to the layout of the instruments on the panel, 200C. This decoupling of computer display position and instrument panel position is useful in several ways. Referring again to FIGS. 3 & 4, it will be recalled that gauges, 224 could not be simulated by the computer displays because they did not fit within the boundaries of the screen. As shown in FIG. 20, the spacing of the original instrument images, 202C, has been adjusted and additional gauge images, 118, have been added to the display. These are paired with additional image transfer assemblies, 120 in FIG. 21. The flexible guides allow the output tapers to be positioned well outside the boundaries of the screens, displaying the gauge faces in their correct positions. In a similar manner, gauge 228 on FIG. 3, can be simulated on the computer display and a single image transfer assembly routed to the correct location among the surrounding equipment.

Figure 19:
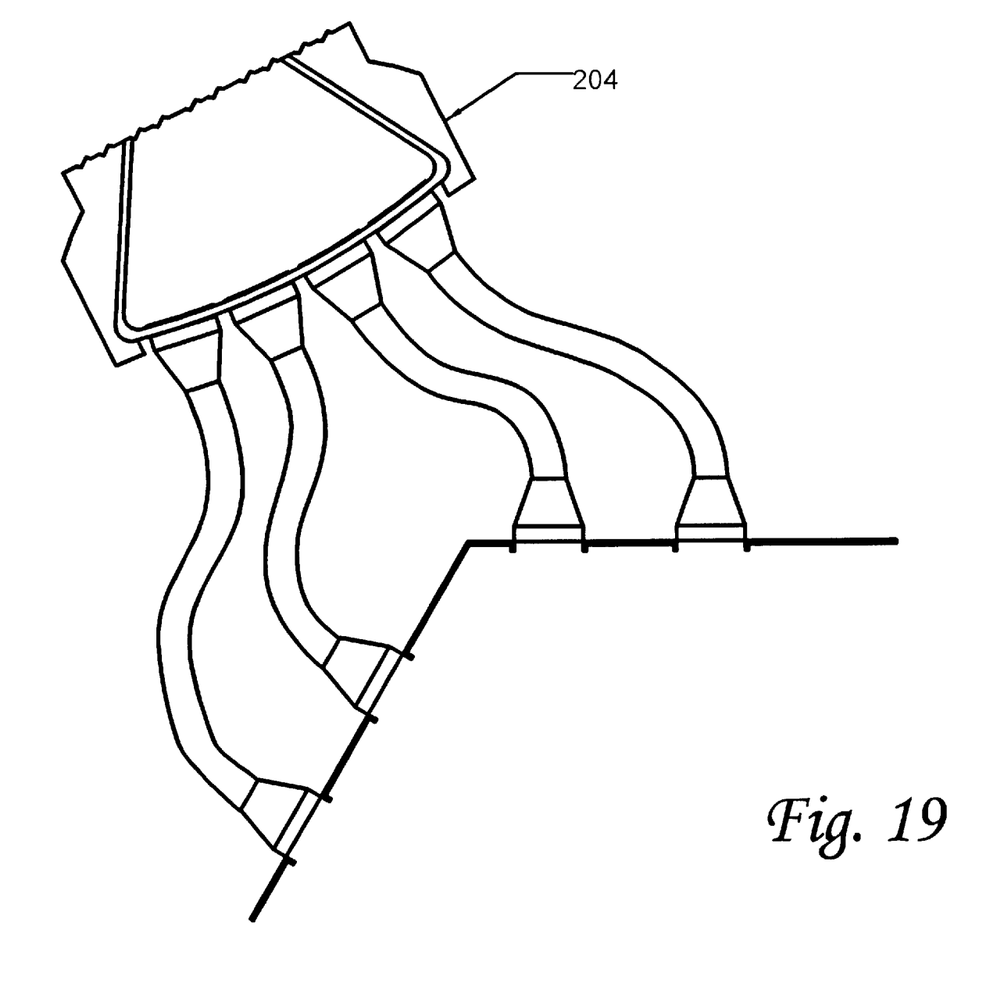
FIG. 19 illustrates the use of the present invention with a single computer display to provide gauge images for plural panels.

In a similar manner, FIG. 19 shows the use of a single computer display to generate images for the instruments on two different panels. In prototyping more complex systems, such as for a power plant or nuclear reactor, there may be several control panels. Part of the design process will be to determine the number and orientation of these panels. Also to be addressed will be the allocation of the various instruments and controls to the panels. The use of the flexible image transfer assemblies allows panels to be repositioned and reoriented without affecting the simulated instrument displays. The simulated instruments can also be repositioned within and across panels with minimal effort.

Figure 23:
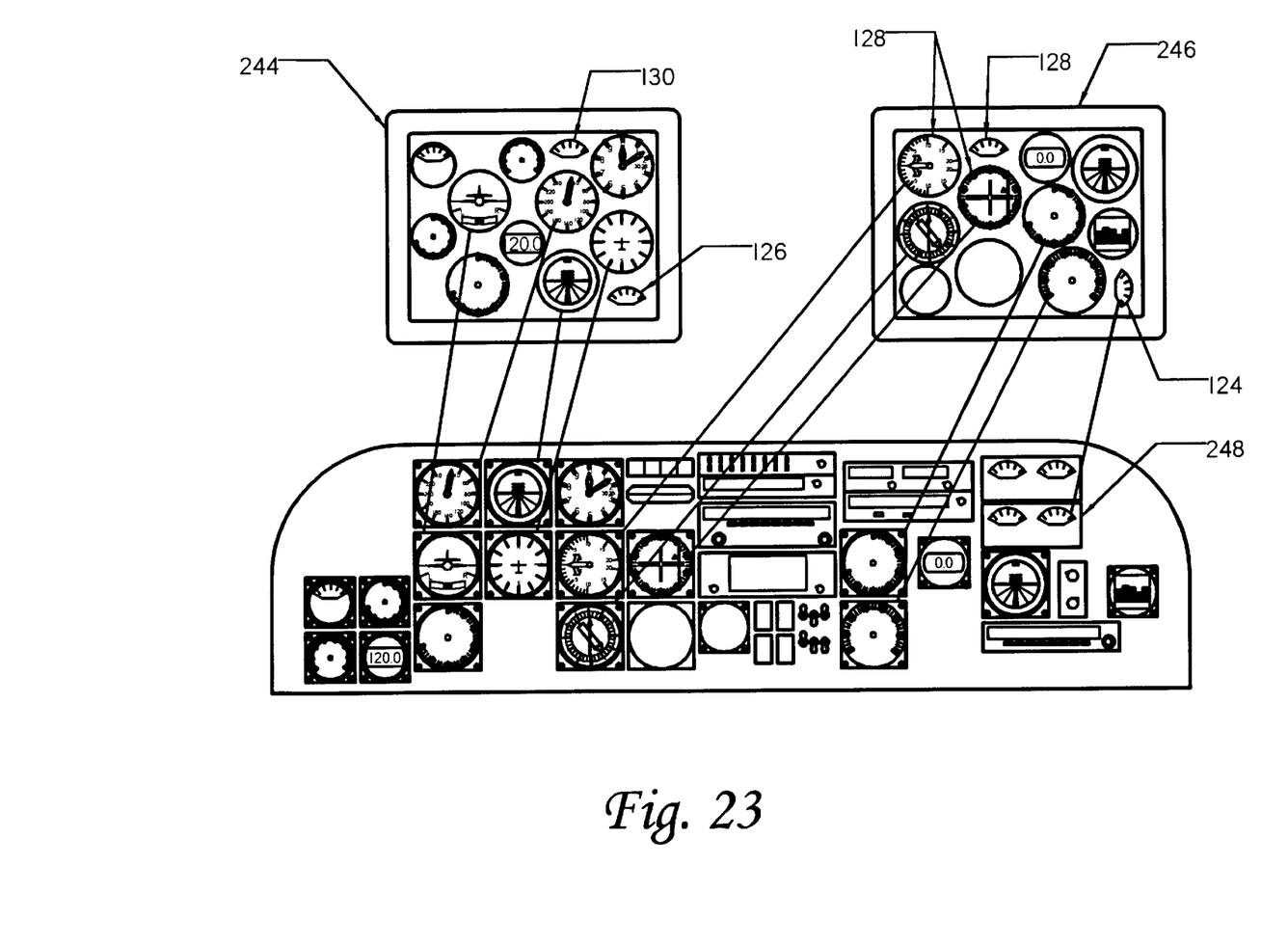
FIG. 23 illustrates the use of two, smaller displays to simulate a full panel of gauges.

A secondary benefit of the flexibility provided by the fiber optic guides is a cost savings resulting from more efficient use of the computer displays. As mentioned above, the positions of the generated images on the computer displays need not correspond to the actual positions on the instrument panel. In FIG. 23 this has been taken advantage of by actually moving the generated images, 128, for the left side of the panel from the left hand display, 244, to the right-hand display, 246. By averaging the load, the maximum number of images on any display is reduced. In the example shown, this allow the displays, 244 and 246, to be smaller than the displays, 204, used in the original version. Significant cost savings can be achieved, especially where the change is away from the largest available displays, often the most expensive in terms of cost per unit of display area. The load averaging may also allow a single size of computer display to be used throughout the system where in a conventional approach, more than one size may be necessary to fit the configuration. This greatly simplifies the task of maintaining and stocking spares for the displays.

Also illustrated in FIG. 23 is the ability to separate clusters of gauges, such as 248, to separate locations, 124–130, on the computer displays. This is much easier in terms of allocating display space than trying to manage a single large block which would encompass the entire group of gauges. While probably not cost effective, it is also technically feasible to build a "split" image transfer assembly to combine the images. A single large taper could be used at the instrument panel. This taper would be coupled to a fiber optic guide which is a single bundle at the output end and splits into multiple (in this case 4) separate bundles which then couple to individual tapers at the computer display (input) end. The inverse would also be feasible.

Further illustrated in FIG. 23 is the ability to generate images, 124, which are rotated relative to their displayed orientation, 248. The display orientation can be achieved either by physically twisting the fiber optic guide or by utilizing a guide, plate or taper which incorporates a twist in the fiber bundle. This further increases the options available to optimize the utilization of space on the computer display.

While the preferred embodiment of the present invention, and much of the above discussion, utilizes the image transfer assemblies in the context of simulated instrument panels for aircraft, as might be used in a flight simulation system, the invention is more broadly applicable. Extending the invention for use in simulations and training mockups of other types of systems is readily apparent. Process control systems such as for chemical manufacturing, power plants and nuclear reactors; ground based vehicles such as tanks, heavy equipment and trucks; Command, Control, and Communications systems; space systems such as the shuttle and international space station and even simpler workstations such as for machine tools or even household appliances could all benefit from the simplified and less expensive prototyping made possible. The technology is also applicable to building functional control and instrument panels instead of just simulating them. Because of the compact display "head" provided, the image transfer assemblies may enable more compact panels than are conventionally available. In cramped vehicles, such as fighter aircraft and submarines, where space is at a premium, remote mounting of the display generating equipment may enable more efficient panel designs.

Figure 24:
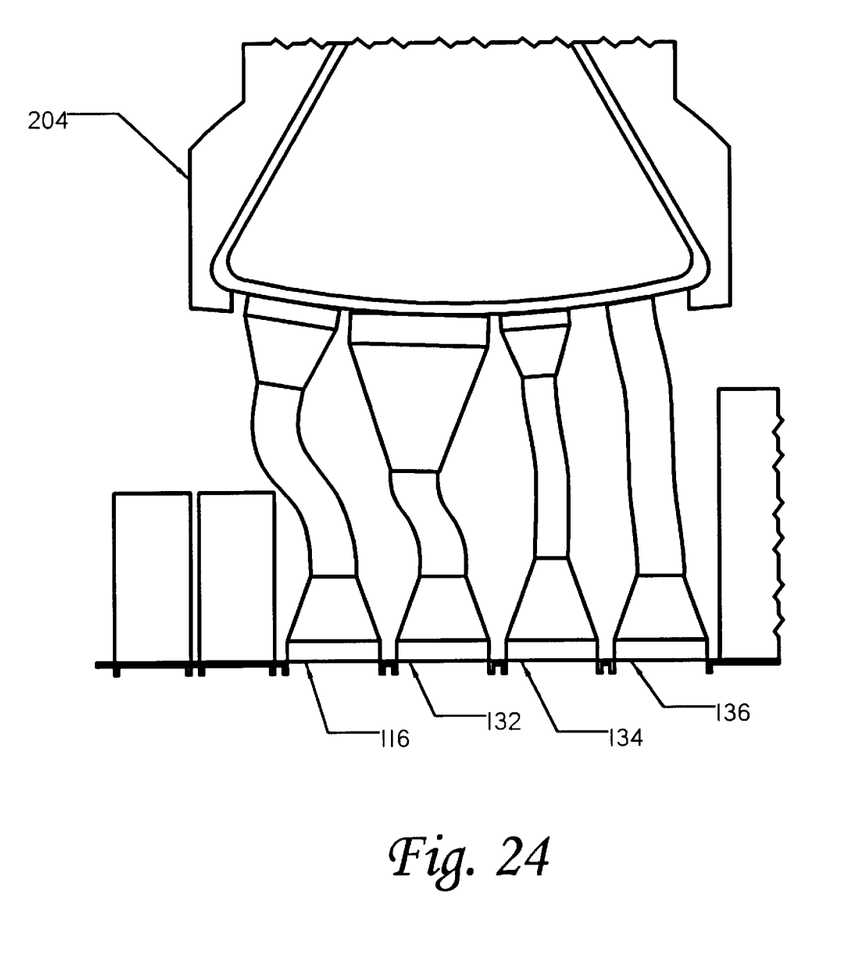
FIG. 24 illustrates several alternative embodiments of the present invention.

While the preferred embodiment utilizes image transfer assemblies which incorporate two equal sized tapers, other configurations are anticipated. FIG. 24 illustrates several alternatives. Image transfer assembly, 116, is the preferred embodiment with equal sized tapers. This provides full size image transfer from one end to the other. This also implies the resolution of the displayed image is the same as the generated image (assuming greater resolution in the fiber optic components than in the computer display). Transfer assembly, 132, utilizes a larger taper, with a larger magnification/minification ratio, at the input end than at the output end. The result is a compressed image at the output. This effectively increases the apparent resolution of the displayed image. Since this can be elected on an instrument by instrument basis, certain critical instruments can be made higher resolution without the need to increase computer display resolution which would be expensive and would affect all of the simulated instruments. It would also enable the use of lower resolution displays, although any cost savings may be offset by the increased cost of the larger tapers.

The opposite approach can also be used. Image transfer assembly, 134, uses a smaller taper at the input end than at the output end. This effectively magnifies the image with a commensurate decrease in resolution. This would allow a larger number of instruments to be simulated in the same amount of computer display area. This could decrease the overall number of displays needed for the entire system resulting in savings in cost, power, and cooling. By combining the compression and magnification versions, screen space can be traded off against resolution, allowing an optimization not previously available.

A final alternative is to utilize a taper only on one end of the guide. As shown, 136, the taper is on the output end. The effect is similar to the configuration, 134, except that the generated image would be sized to the diameter of the guide itself. While likely to produce a resolution decrease with smaller diameter guides, it would likely be satisfactory for small gauges such as where the gauge is only 24 times the diameter of the fiber optic guide. This arrangement could also be reversed, providing high resolution instrument displays at approximately the diameter of the guide. This would be applicable to prototyping smaller panels such as for test equipment. Both arrangements afford a cost savings by eliminating one taper. As mentioned above, a fiber optic face plate may be necessary to provide optical coupling, especially at the end with no taper.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A method of displaying images comprising:
   (a) providing a general purpose computer comprising:
      (i) a processing unit; and
      (ii) a display unit responsive to said processing unit;
   (b) providing a mounting panel having at least one opening;
   (c) providing a fiber optic image transfer assembly comprising:
      (i) a fiber optic guide having two ends;
      (ii) two fiber optic tapers, each of said fiber optic tapers having a large diameter end and a small diameter end;
      (iii) each of said fiber optic tapers optically coupled at its small diameter end to a different of said fiber optic guide ends;
   (d) optically coupling the large diameter end of a first of said fiber optic tapers to said computer display unit;
   (e) mounting the second of said fiber optic tapers to said mounting panel in substantial alignment with said opening;
   (f) causing said general purpose computer to generate an image on said computer display unit substantially in alignment with said first fiber optic taper;
      whereby said generated image is transferred to the large diameter end of said second fiber optic taper for viewing.

2. The method of displaying images of claim 1 wherein said fiber optic guide is flexible.

3. The method of displaying images of claim 1 wherein said fiber optic tapers are of substantially the same size.

4. The method of displaying images of claim 1 wherein said fiber optic tapers are of substantially different size.

5. The method of displaying images of claim 1 wherein plural fiber optic image transfer assemblies are provided.

6. The method of displaying images of claim 5 wherein all of said fiber optic image transfer assemblies comprise fiber optic tapers of substantially equal diameters.

7. The method of displaying images of claim 5 wherein at least one of said fiber optic image transfer assemblies comprises fiber optic tapers of equal diameters, said diameters being substantially different than the fiber optic taper diameters used in another of said fiber optic image transfer assemblies.

8. The method of displaying images of claim 5 wherein at least one of said fiber optic image transfer assemblies comprises a first fiber optic taper which has at least one diameter which is substantially different than the corresponding diameter of the second fiber optic taper.

9. The method of displaying images of claim 8 wherein at least one other of said fiber optic transfer assemblies comprises fiber optic tapers which are of equal diameter.

* * * * *